United States Patent
Abe et al.

(10) Patent No.: US 10,145,749 B2
(45) Date of Patent: Dec. 4, 2018

(54) PHYSICAL QUANTITY MEASURING DEVICE INCLUDING A SENSOR MODULE AND A JOINT FOR LOCKING THE SENSOR MODULE

(71) Applicant: NAGANO KEIKI CO., LTD., Tokyo (JP)

(72) Inventors: Yusuke Abe, Tokyo (JP); Shuji Tohyama, Tokyo (JP); Haruhiko Sekiya, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days.

(21) Appl. No.: 15/363,184

(22) Filed: Nov. 29, 2016

(65) Prior Publication Data

US 2017/0153157 A1    Jun. 1, 2017

(30) Foreign Application Priority Data

Dec. 1, 2015   (JP) .................................. 2015-235138

(51) Int. Cl.
*G01L 19/14*   (2006.01)
*G01L 9/00*    (2006.01)

(52) U.S. Cl.
CPC .......... *G01L 9/0041* (2013.01); *G01L 9/0051* (2013.01); *G01L 19/143* (2013.01);
(Continued)

(58) Field of Classification Search
CPC ... G01L 19/003; G01L 19/147; G01L 9/0041; G01L 19/142; G01L 19/0038;
(Continued)

(56) References Cited

U.S. PATENT DOCUMENTS 5,351,550 A     10/1994   Maurer
2002/0062697 A1*  5/2002  Yamagishi .......... G01L 19/0084
                                                                    73/715
(Continued)

FOREIGN PATENT DOCUMENTS

DE    102013220091 A1    4/2015
JP    2003-042882        2/2003
(Continued)

OTHER PUBLICATIONS

European Search Report dated Apr. 28, 2017, 7 pages.
Japanese Office Action with English Translation dated May 29, 2018, 5 pages.

*Primary Examiner* — Harshad R Patel
*Assistant Examiner* — Brandi N Hopkins
(74) *Attorney, Agent, or Firm* — Rankin, Hill & Clark LLP

(57) ABSTRACT

A physical quantity measuring device includes: a sensor module provided with a diaphragm; a joint to which the sensor module is attached, the joint including a pressure inlet for delivering fluid to be measured to the sensor module. The joint is made of a synthetic resin and includes a joint body and an elastically deformable claw provided to the joint body and configured to lock the sensor module. Since the claw keeps the sensor module to be held by virtue of the elastic force of the claw, a further attachment process such as welding for attaching the sensor module to the joint is unnecessary. Since the joint body and the claw are integrally made of synthetic resin, it is not necessary to separately manufacture the joint body and the claw.

4 Claims, 3 Drawing Sheets

(52) U.S. Cl.
CPC .......... *G01L 19/144* (2013.01); *G01L 19/147* (2013.01); *G01L 19/148* (2013.01)

(58) Field of Classification Search
CPC ......... Y10T 29/49918; Y10T 29/49774; Y10T 29/49927; Y10T 29/49103
See application file for complete search history.

(56) References Cited

U.S. PATENT DOCUMENTS

| | | |
|---|---|---|
| 2003/0150274 A1 | 8/2003 | Pitzer |
| 2003/0154795 A1 | 8/2003 | Pitzer |
| 2009/0049921 A1 | 2/2009 | Otsuka et al. |
| 2013/0056100 A1 | 3/2013 | Imaizumi et al. |
| 2014/0260649 A1 | 9/2014 | Petrucelli |

FOREIGN PATENT DOCUMENTS

| | | |
|---|---|---|
| JP | 2004-325210 | 11/2004 |
| JP | 2005-214843 | 8/2005 |
| JP | 2008-203066 | 9/2008 |
| JP | 5499169 | 5/2014 |
| JP | 2014-182011 | 9/2014 |

\* cited by examiner

PHYSICAL QUANTITY MEASURING DEVICE INCLUDING A SENSOR MODULE AND A JOINT FOR LOCKING THE SENSOR MODULE

The entire disclosure of Japanese Patent Application No. 2015-235138 filed Dec. 1, 2015 is expressly incorporated by reference herein.

TECHNICAL FIELD

The present invention relates to a physical quantity measuring device.

BACKGROUND ART

Physical quantity measuring devices have been known as means for measuring physical quantity (e.g. pressure) of fluid to be measured.

Examples of the typical physical quantity measuring device include a pressure sensor unit having a pressure sensor held by holders (Patent Literature 1: JP-B-5499169).

In Patent Literature 1, the holders include a first holder provided with a flange that holds an end of the pressure sensor near an opening and a second holder provided with a flange that holds an end of the pressure sensor near a diaphragm, where the first holder is a component independent of the second holder.

As another example of the physical quantity measuring device, a measurement/display unit including: a casing; a vibration sensor disposed on a bottom of the casing; and a support mechanism disposed inside the casing and provided with a fixing claw for fixing the vibration sensor on the bottom has been disclosed (Patent Literature 2: JP-A-2005-214843).

In Patent Literature 2, the support mechanism is made of a plastic material or the like. The fixing claw is integrated with the support mechanism.

Still another example of the typical physical quantity measuring device includes a sensor attachment mechanism including: a sensor body; and an attachment portion on which the sensor body is attached, the attachment portion being attached to a cylindrical portion (Patent Literature 3: JP-A-2004-325210).

In Patent Literature 3, the attachment portion is made of a synthetic resin and includes: a flange surrounding an outer circumferential portion of the sensor body; a pair of attachment pieces attached to the flange; and an engagement claw provided to each of the attachment pieces, the engagement claw being engaged with an engagement hole provided on the cylindrical portion.

In Patent Literature 1, since the first holder and the second holder are independent components, the number of the components and, consequently, production cost increases. In addition, since the pressure sensor is mounted on the flange of the first holder and the pressure sensor is covered with the second holder from a side near the diaphragm and pressed by the flange of the second holder in assembling the pressure sensor unit, the sensor assembly process becomes complicated.

The device disclosed in Patent Literature 2 is configured to measure vibrations, not pressure. Accordingly, it is not necessary to provide a joint provided with a port for delivering the fluid to be measured toward the sensor module, and thus a structure for attaching the sensor module to the joint is not disclosed.

In Patent Literature 3, since the attachment portion attached to the sensor body is attached to the cylindrical portion, an additional step for attaching the attachment portion to the sensor body is required. In addition, since the engagement hole has to be formed on the cylindrical portion, the strength of the cylindrical portion per se may be decreased. Supposing that the cylindrical portion corresponds to the joint, a hole in the joint in addition to the pressure inlet may result in decrease in strength of the joint.

SUMMARY OF THE INVENTION

An object of the invention is to provide a physical quantity measuring device capable of easily and inexpensively performing an attachment work of a sensor module on a joint.

A physical quantity measuring device according to an aspect of the invention includes: a sensor module including a diaphragm provided with a detector configured to detect a pressure of a fluid to be measured; and a joint on which the sensor module is attached, the joint including a pressure inlet configured to deliver the fluid to be measured to the sensor module, in which the joint is made of a synthetic resin and includes: a joint body attachable to a target member, and an elastically deformable claw provided to the joint body and configured to lock the sensor module.

In the above aspect of the invention, in order to attach the sensor module to the joint, the claw provided on the joint body is elastically deformed to hold the sensor module. Since the joint is made of synthetic resin, the claw is elastically deformable. When a force for deforming the claw is applied in order to hold the sensor module, the claw is easily deformed against the elastic force. The claw holding the sensor module keeps the sensor module to be held by virtue of the elastic force thereof.

Accordingly, in the above aspect of the invention, since an additional step (e.g. welding) is not necessary in order to attach the sensor module to the joint, the sensor module can be easily attached to the joint. Further, since the joint body and the claws are integrally made of synthetic resin, it is not necessary to separately manufacture the joint body and the claw, so that the number of components can be reduced.

In the above aspect of the invention, it is preferable that a deformation prevention member surrounding an outside of the claw, the deformation prevention member being configured to prevent a deformation of the claw in a direction away from the sensor module is provided.

According to the above arrangement, the deformation prevention member presses an outer portion of the claw to keep the claw from stretching outward and to prevent the consequent detachment of the sensor module.

In the above aspect of the invention, it is preferable that the claw holds an outer periphery of the sensor module, and the deformation prevention member includes a plate portion and a cylindrical portion integrally provided on an outer periphery of the plate portion, the claw being configured to be pressed by an inner circumferential portion of the cylindrical portion.

According to the above arrangement, since the cylindrical portion of the deformation prevention member prevents the deformation of the claw in a direction away from the sensor module, the sensor module can be reliably held by the claw. Since the deformation prevention member is provided with the plate portion integrated with the cylindrical portion, not only the strength of the deformation prevention member increases, but, since the sensor module is covered with the plate portion, dust and the like can be kept from being entered.

In the above aspect of the invention, it is preferable that the sensor module is provided with an electrical connector, and an opening that is configured to expose the electrical connector to an outside is provided to the deformation prevention member.

According to the above arrangement, since a part of the electrical connector is exposed through the opening of the deformation prevention member, the electrical connector can be easily connected with other electronic device (e.g. control device). Thus, the detection signal detected by the detector is outputted to the other electronic device through the electrical connector.

In the above aspect of the invention, it is preferable that the sensor module is provided with a locking groove configured to lock the claw.

According to the above arrangement, since the claw is engaged with the locking groove of the sensor module, the circumferential movement of the sensor module is blocked.

BRIEF DESCRIPTION OF DRAWING(S)

DESCRIPTION OF EMBODIMENT(S)

Exemplary embodiment(s) of the invention will be described below with reference to the attached drawings.

Figure 1:
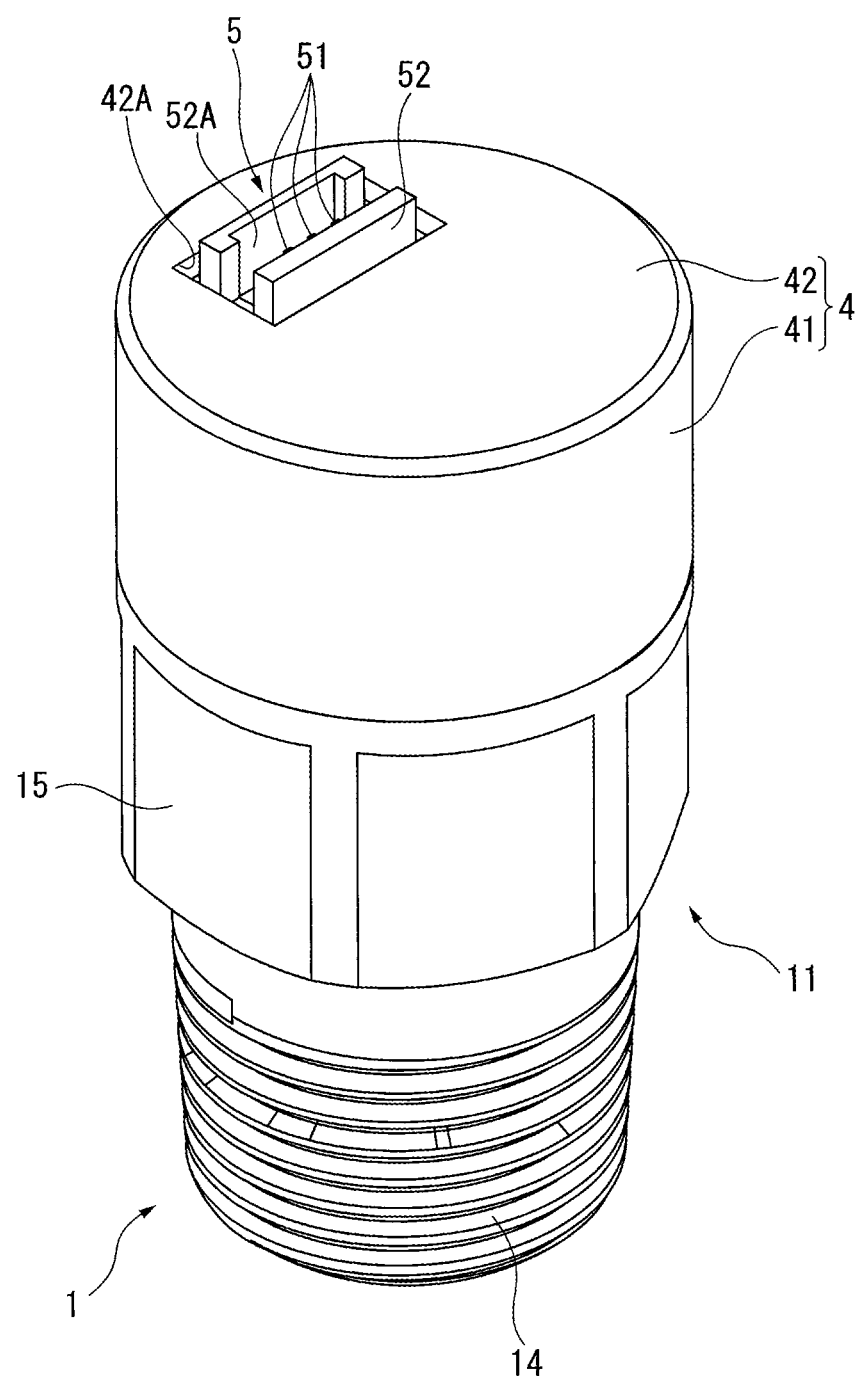
FIG. 1 is a perspective view showing a physical quantity measuring device according to an exemplary embodiment of the invention.
Figure 2:
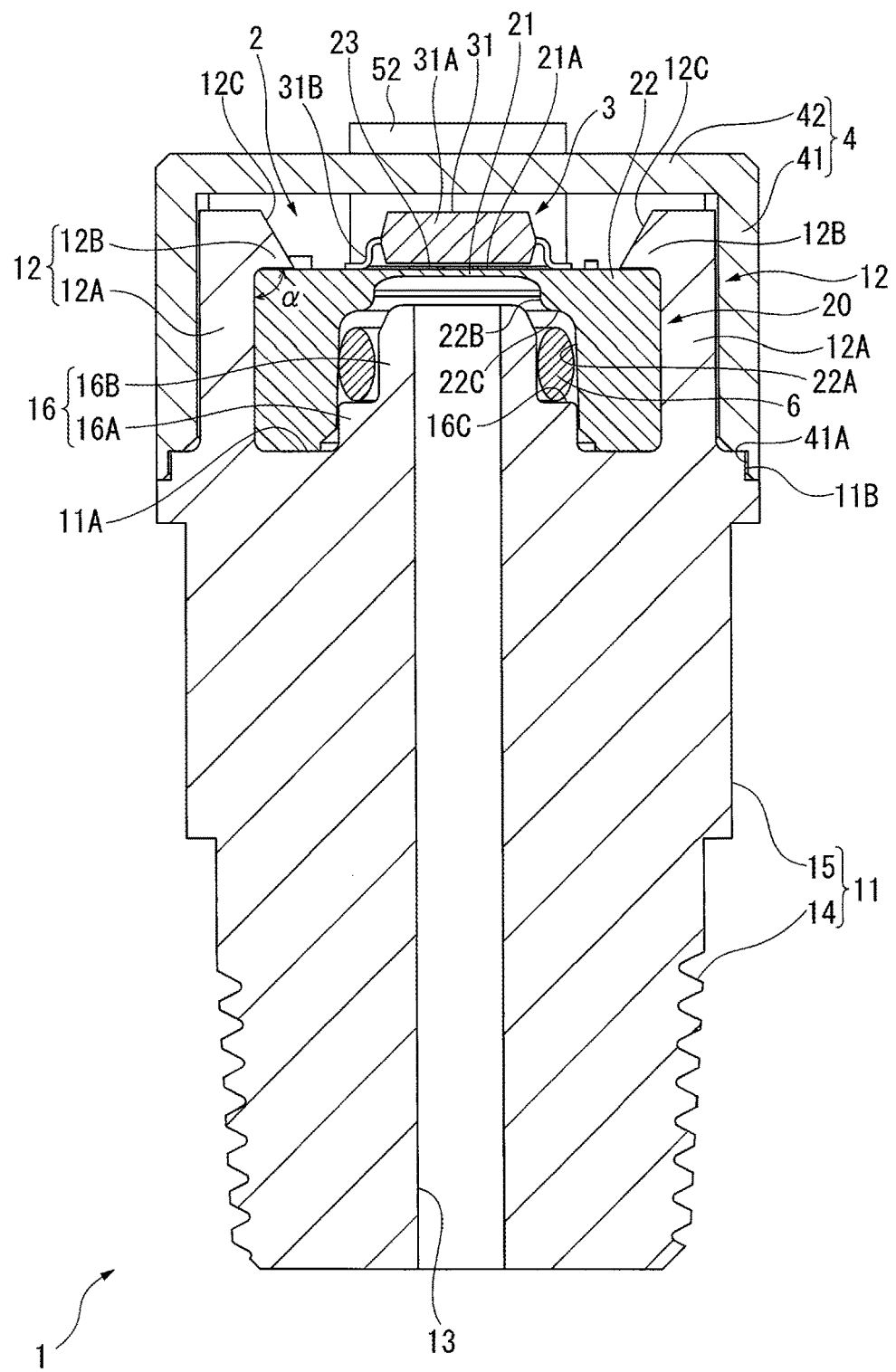
FIG. 2 is a cross section of the physical quantity measuring device according to the exemplary embodiment.
Figure 3:
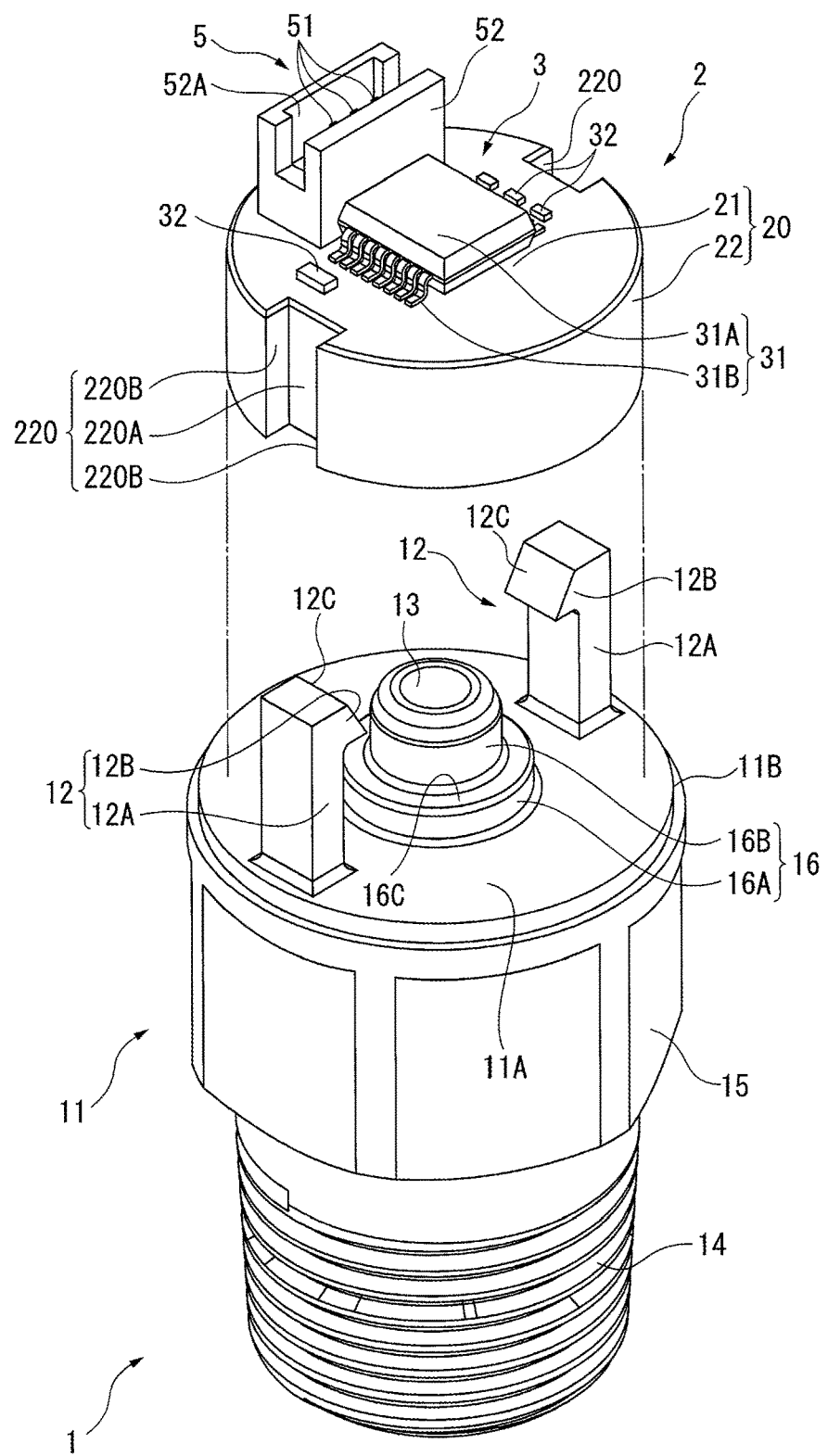
FIG. 3 is an exploded perspective view showing how a sensor module and a joint are assembled.

An overall structure of a physical quantity measuring device according to the exemplary embodiment is shown in FIGS. 1 to 3.

As shown in FIGS. 1 to 3, the physical quantity measuring device includes: a joint 1; a sensor module 2 provided on the joint 1; an electronic circuit 3 provided on the sensor module 2; a deformation prevention member 4 covering the sensor module 2; and an electrical connector 5 connected with the electronic circuit 3. The physical quantity measuring device of this exemplary embodiment is a pressure detector configured to detect pressure of fluid to be measured.

The joint 1 is made of a synthetic resin. The joint 1 includes a joint body 11 attached to a target member (not shown) and an elastically deformable claw 12 provided to the joint body 11.

A pressure inlet 13 for delivering the fluid to be measured to the sensor module 2 is provided inside the joint body 11 along a central axis thereof.

A male screw 14 to be meshed with the target member is provided on an outer circumferential portion of a first end of the joint body 11. A polygonal portion 15 used for screwing the male screw 14 is provided on an outer circumferential portion of a second end of the joint body 11. It should be noted that it is not necessary that the male screw 14 is provided on the joint body 11 but, for instance, the joint body 11 may have an attachment structure including a flange, which is inserted into a hole in the target portion to serve as an axial seal to keep the joint body 11 being attached to the target member.

The joint body 11 includes a projecting portion 16 projecting from an end face 11A on the second end of the joint body 11. The projecting portion 16 includes: a large-diameter portion 16A formed on the end face 11A; and a small-diameter portion 16B formed on the large-diameter portion 16A. The pressure inlet 13 opens at the small-diameter portion 16B.

A step 11B is provided on an outer periphery of the end face 11A of the joint body 11.

A flat surface 16C in a plane extending in a radial direction of the joint body 11 is defined at a border between the large-diameter portion 16A and the small-diameter portion 16B.

The claw 12 holds an outer periphery of the sensor module 2 and includes two claws 12 facing each other across a central axis of the sensor module 2.

Each of the claws 12 includes a rise portion 12A in a form of a rectangular column whose inner face opposes an outer face of the sensor module 2 and a hook 12B defined at an end of the rise portion 12A and extended toward the central axis of the sensor module 2.

An angle $\alpha$ defined by the inner face of the rise portion 12A and a face of the hook 12B facing the sensor module 2 is 90 degrees in the figure. A slant surface 12C serving as a guide face when the sensor module 2 is attached to the joint body 11 is formed on a face of the hook 12B opposite the face facing the sensor module 2. It should be noted that the configuration of each of the claws 12 is not limited to that shown in the drawings as long as each of the claws 12 is adapted to prohibit the sensor module 2 from being upwardly detached. For instance, the angle $\alpha$ is not necessarily 90 degrees.

The sensor module 2 includes a ceramic module body 20, a detector 23 configured to detect a displacement of the diaphragm 21 and a pad (not shown) electrically connected to the detector 23. An O ring (not shown) is provided between the module body 20 and the joint body 11.

The module body 20 includes the diaphragm 21 and a cylindrical portion 22 integrally provided on a periphery of the diaphragm 21.

The diaphragm 21 is a thin disc-shaped member configured to be displaced in accordance with the pressure of the fluid to be measured delivered through the joint body 11.

A flat surface 21A, on which the detector 23 is provided, is defined on a first surface of the diaphragm 21 opposite a second surface of the diaphragm 21 with which the fluid to be measured to is in contact. The detector 23 includes a strain gauge and an electrically conductive pattern (both not shown).

Locking grooves 220 for locking each of the claws 12 is provided on the outer circumferential portion of the cylindrical portion 22 in parallel to the axial direction of the cylindrical portion 22.

Each of the locking grooves 220 includes a first opposing face 220A facing the inner face of the rise portion 12A of each of the claws 12 and second opposing faces 220B orthogonally provided on both ends of the first opposing face 220A and each facing a lateral face of the rise portion 12A, thereby defining a C-shape in a plan view.

A large-diameter portion 22A in communication with an opening of the cylindrical portion 22 and a small-diameter portion 22B continuous with the large-diameter portion 22A are provided on an inner circumferential portion of the cylindrical portion 22. A flat surface 22C in a plane extending in a radial direction of the cylindrical portion 22 is defined at a border between the large-diameter portion 22A and the small-diameter portion 22B.

An O ring 6 is disposed between the flat surface 16C and the flat surface 22C. The O ring 6 is suitably shaped so that the flow of the fluid to be measured is sealed by the O-ring 6.

The electronic circuit 3 includes a signal processing circuit 31 and an circuit parts 32. The signal processing circuit 31 includes a plate-shaped circuit body 31A, and legs 31B connected to mutually opposite lateral faces of the circuit body 31A. The circuit body 31A is spaced apart from the diaphragm 21 on which the detector 23 is disposed. The legs 31B are connected to a flat surface of the cylindrical portion 22.

The electrical connector 5 is disposed on the diaphragm 21 of the sensor module 2. The electrical connector 5 includes: a terminal 51 electrically connected with the signal processing circuit 31 and the circuit parts 32; and a terminal holder 52 that holds the terminal 51. The pad of the sensor module 2, the electronic circuit 3 and the electrical connector 5 are connected through an electric circuit, whereby an output signal detected by the detector 23 is outputted from the electrical connector 5 to an external device (not shown).

The terminal holder 52 is a synthetic resin component in a form of a rectangular parallelepiped. The terminal holder 52 is provided with a notch 52A for upwardly exposing the terminal 51 to allow the terminal 51 to be fitted and connected with a mating connector.

The deformation prevention member 4 is a cap-shaped component including: a cylindrical portion 41 disposed at an outside of each of the claws 12; and a plate portion 42 whose outer periphery is integrated with the cylindrical portion 41. The material of the deformation prevention member 4 is not specifically limited but may be made of metal, synthetic resin and the like.

The cylindrical portion 41 is configured to prevent the deformation of each of the claws 12 in a direction away from the sensor module 2 and to press the rise portion 12A of each of the claws 12 toward the sensor module 2 by the inner circumferential portion thereof.

The inner circumferential portion of the cylindrical portion 41 has a circular profile. The outer face of the rise portion 12A in the form of rectangular column is in contact with the inner circumferential portion of the cylindrical portion 41. It should be noted that, in order to enlarge the contact area of the inner circumferential portion of the cylindrical portion 41 and the outer face of the rise portion 12A, the profile of the outer portion of the rise portion 12A may be configured in a form of an arc to conform to the inner circumferential portion of the cylindrical portion 41 in this exemplary embodiment. Further, in this exemplary embodiment, an axially extending groove may be formed on the inner circumferential portion of the cylindrical portion 41 and the outer face of the rise portion 12A may be fitted in the groove.

An open end of the cylindrical portion 41 is provided with a step 41A engaged with the step 11B on the end face 11A of the joint body 11.

The plate portion 42 is a disc-shaped component and is provided at a part thereof with an opening 42A for exposing the electrical connector 5 to an outside. The opening 42A is in a form of a rectangle in a plan view to conform to the shape of the electrical connector 5.

An assembly process of the physical quantity measuring device in this exemplary embodiment will be described below.

Initially, the electronic circuit 3 and the electrical connector 5 are attached to the sensor module 2 in advance, and the O-ring 6 is coaxially attached to the small-diameter portion 16B. Then, the sensor module 2 is attached to the joint body 11 (see FIG. 3).

At the time of the attachment, after the position of an end of each of the locking grooves 220 of the sensor module 2 and the position of each of the claws 12 of the joint 1 are aligned, the sensor module 2 is pressed toward the joint body 11 of the joint 1 while keeping the position of the end of each of the locking grooves 220 and the position of each of the claws 12 to be aligned.

At this time, since each of the claws 12 is provided with the slant surface 12C, each of the locking grooves 220 of the sensor module 2 is guided along the slant surface 12C and the end of the rise portions 12A is elastically deformed outward. Then, the end of the hook 12B moves while being in contact with each of the locking grooves 220 and, when the cylindrical portion 22 of the sensor module 2 is in contact with the end face 11A of the joint body 11, each of the rise portions 12A is brought into contact with each of the locking grooves 220 all over the longitudinal length thereof by virtue of the elastic restoration force of the rise portions 12A, so that the hooks 12B are positioned on the flat surface of the cylindrical portion 22 of the sensor module 2. Thus, the sensor module 2 is held by the claws 12.

Subsequently, the sensor module 2 is covered with the deformation prevention member 4. At this time, the electrical connector 5 is inserted into the opening 42A provided on the plate portion 42 of the deformation prevention member 4. The electronic device (not shown) is connected through a cable to the electrical connector 5 exposed to an outside through the opening 42A.

The above-described exemplary embodiment provides the following advantages.

(1) The synthetic resin joint 1 attached with the sensor module 2 includes the joint body 11 attached to a target member and the elastically deformable claws 12 provided on the joint body 11 and engaged with the sensor module 2. Since the claws 12 keep the sensor module 2 to be held by virtue of the elastic force thereof, an additional attachment process (e.g. welding) for attaching the sensor module 2 to the joint 1 is unnecessary. Further, since the joint body 11 and the claws 12 are integrally made of a synthetic resin, it is not necessary to separately manufacture the joint body 11 and the claws 12.

(2) Since the deformation prevention member 4 for preventing the deformation of the claws 12 in a direction away from the sensor module 2 is provided outside the claws 12, enlargement of the distance between the claws 12 holding the sensor module 2 and subsequent detachment of the sensor module 2 can be prevented.

(3) The deformation prevention member 4 includes the plate portion 42 and the cylindrical portion 41 integrated with the outer periphery of the plate portion 42, and presses the claws 12 with the inner circumferential portion of the cylindrical portion 41. Since the cylindrical portion 41 prevents the deformation of the claws 12 in the direction away from the sensor module 2, the sensor module 2 can be reliably held by the claws 12. In addition, since the deformation prevention member 4 is provided with the plate portion 42 integrated with the cylindrical portion 41, not only the strength of the deformation prevention member 4 increases, but, since the sensor module 2 is covered with the plate portion 42, dust and the like can be kept from being entered.

(4) Since the claw 12 includes the two claws 12 disposed at mutually opposite positions, the sensor module 2 can be reliably pressed at the two positions. In addition, the production of the joint 1 can be facilitated. For instance, when the joint 1 is manufactured through an injection molding process, though each of the claws 12 is a component of a complicated shape including the hook 12B, the structure of the injection molding die can be simplified because the joint 1 is axis-symmetrical with respect to a line passing through the two claws 12 and the projecting portion 16.

(5) Since each of the claws 12 includes the rise portion 12A provided on the joint body 11 and the hook 12B provided at an end of the rise portion 12A and extended toward the central axis of the sensor module 2, the radial movement as well as the axial movement of the sensor module 2 with respect to the joint body 11 can be restricted.

(6) Since a part of the electrical connector 5 disposed on the sensor module 2 is exposed through the opening of the deformation prevention member 4, the electrical connector 5 can be easily connected to a control device provided at an outside.

(7) Since the sensor module 2 is provided with the locking grooves 220 with which the claws 12 are engaged, a circumferential movement of the sensor module 2 is prohibited.

Incidentally, it should be understood that the scope of the present invention is not limited to the above-described exemplary embodiment(s) but includes modifications and improvements as long as the modifications and improvements are compatible with the invention.

For instance, though the deformation prevention member 4 in the above-described exemplary embodiment includes the cylindrical portion 41 and the plate portion 42, as long as the claws 12 can be pressed by the inner circumferential portion of the cylindrical portion 41, the structure of the deformation prevention member 4 is not specifically limited. For instance, the plate portion 42 may be omitted and the deformation prevention member 4 may include only the cylindrical portion 41. The shape of the inner circumference of the cylindrical portion 41 may be an ellipse or a rectangle. In the invention, when the claws 12 have sufficiently large strength, the deformation prevention member 4 per se is not necessary.

Though each of the claws 12 includes the rise portion 12A provided on the joint body 11 and the hook 12B integrally formed at an end of the rise portion 12A, the hook 12B may be omitted in the invention. The hook 12B can be omitted by devising a mechanism for increasing a friction resistance between the rise portion 12A and the sensor module 2 (e.g. providing a rubber sheet between the rise portion 12A and the sensor module 2). When the hook 12B is provided, the shape of the hook 12B is not limited to the shape described in the above exemplary embodiment, For instance, the hook 12B may have an arrowhead end or a spherical end. In the invention, the hook 2B may be formed by: lengthening the rise portion 12A; pressing the sensor module 2 against the joint body 11 of the joint 1 with the rise portion 12A being guided along the locking groove 220; and bending an end of the rise portion 12A toward the center of the sensor module 2. In order to bend the end of the rise portion 12A, various methods can be taken. For instance, the end of the rise portion 12A may be heated to be deformed, or may be deformed using ultrasonic vibrations.

Though the number of the claws 12 is two in the above-described exemplary embodiment, the number of the claws 12 is not limited to two, but only one claw 12 or three or more claws 12 may be provided. When three or more claws 12 are provided, it is preferable that mutually adjacent ones of the claws are equally spaced.

Though the sensor module 2 in the above-described embodiment includes the diaphragm 21 and the cylindrical portion 22, the structure of the sensor module 2 in the invention is not limited to that in the above exemplary embodiment, but, for instance, the sensor module may include a board, a diaphragm opposed to a side of the board and a detector provided to the diaphragm and the board to detect the displacement of the diaphragm. In this arrangement, a joint body may be provided without providing the projecting portion 16 to the joint body 11 and the sensor module may be face-sealed with respect to the joint body using an O-ring. The electrical connector 5 is connected to a circuit component necessary for outputting the signal outputted from the detector of the sensor module to an outside.

Even when the diaphragm and the cylindrical portion are provided, it is not necessary that the diaphragm and the cylindrical portion are ceramic components in the invention but the diaphragm and the cylindrical portion may be metal components.

Further, the physical quantity measuring device of the invention is not limited to be used for pressure measurement as in the exemplary embodiment, but the physical quantity measuring device may be used for measuring differential pressure and the like.

As described above, the invention encompasses any specific arrangement where a claw component integrated with a joint is configured to hold a sensor module.

What is claimed is:

1. A physical quantity measuring device comprising:
    a sensor module comprising a diaphragm provided with a detector configured to detect a pressure of a fluid to be measured; and
    a joint on which the sensor module is attached, the joint comprising a pressure inlet configured to deliver the fluid to be measured to the sensor module, wherein
    the sensor module comprises a module body comprising the diaphragm provided with the detector and a cylindrical portion integrally formed on an outer periphery of the diaphragm,
    the joint is made of a synthetic resin and comprises: a joint body attachable to a target member, the joint body includes an elastically deformable claw configured to lock the cylindrical portion, and
    a locking groove configured to lock the claw is provided on an outer circumferential portion of the cylindrical portion.

2. The physical quantity measuring device according to claim 1, further comprising:
    a deformation prevention member surrounding an outside of the claw, the deformation prevention member being configured to prevent a deformation of the claw in a direction away from the sensor module.

3. The physical quantity measuring device according to claim 2, wherein
    the claw holds an outer periphery of the sensor module, and
    the deformation prevention member comprises a plate portion and a cylindrical portion integrally provided on an outer periphery of the plate portion, the claw being configured to be pressed by an inner circumferential portion of the cylindrical portion.

4. The physical quantity measuring device according to claim 3, wherein
    the sensor module is provided with an electrical connector, and an opening that is configured to expose the electrical connector to an outside is provided to the deformation prevention member.

\* \* \* \* \*